(12) United States Patent
Pearson

(10) Patent No.: US 10,382,793 B2
(45) Date of Patent: Aug. 13, 2019

(54) APPARATUSES AND METHODS FOR PERFORMING INFORMATION EXTRACTION AND INSERTION ON BITSTREAMS

(71) Applicant: Integrated Device Technology, Inc., San Jose, CA (US)

(72) Inventor: Eric C. Pearson, Conestogo (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 414 days.

(21) Appl. No.: 14/747,879

(22) Filed: Jun. 23, 2015

(65) Prior Publication Data
US 2016/0381365 A1  Dec. 29, 2016

(51) Int. Cl.
*H04N 19/91* (2014.01)
*H04N 19/44* (2014.01)
*H04N 19/436* (2014.01)

(52) U.S. Cl.
CPC ........... *H04N 19/91* (2014.11); *H04N 19/436* (2014.11); *H04N 19/44* (2014.11)

(58) Field of Classification Search
None
See application file for complete search history.

(56) References Cited

U.S. PATENT DOCUMENTS

| | | | | |
|---|---|---|---|---|
| 7,061,410 B1* | 6/2006 | Pearson | .................. | H04N 19/40 341/106 |
| 7,595,743 B1* | 9/2009 | Winger | .................. | H04N 19/13 341/107 |
| 2005/0152448 A1* | 7/2005 | Crinon | ............. | H04N 21/23424 375/240.01 |
| 2008/0129559 A1* | 6/2008 | Choi | .................... | H04N 19/176 341/67 |
| 2010/0322317 A1* | 12/2010 | Yoshimatsu | ........... | H04N 19/70 375/240.24 |
| 2011/0280314 A1* | 11/2011 | Sankaran | .............. | G06F 9/3877 375/240.25 |
| 2013/0107952 A1* | 5/2013 | Coban | .................. | H04N 19/105 375/240.12 |
| 2013/0272370 A1* | 10/2013 | Coban | .................. | H04N 19/174 375/240.01 |

(Continued)

*Primary Examiner* — Kaitlin A Retallick
(74) *Attorney, Agent, or Firm* — Christopher P. Maiorana, PC

(57) ABSTRACT

Examples of methods and apparatus for performing wavefront parallel decode of video bitstreams are described herein. An example apparatus includes a CABAC decoder configured to decode a CABAC bitstream and generate an output bitstream. The output bitstream contains a plurality of NAL units, each NAL unit being associated with a respective row of a macroblock. The apparatus includes an extractor block configured to extract entry point information associated with a row, and a memory configured to store the extracted entry point information associated with the row. The apparatus includes an insertion block configured to read from the memory the entry point information and insert the entry point information into the NAL unit associated with the row. The plurality of NAL units are provided to at least one macroblock decoder for performing parallel wavefront decode on the output bitstream.

22 Claims, 16 Drawing Sheets

(56) References Cited

U.S. PATENT DOCUMENTS

2013/0279597 A1* 10/2013 Pearson .................. H04N 19/70
375/240.24
2014/0003531 A1* 1/2014 Coban .................... H04N 19/70
375/240.24
2014/0086306 A1* 3/2014 Esenlik .................. H04N 19/46
375/240.02
2015/0103921 A1* 4/2015 Hannuksela ......... H04N 19/152
375/240.26

* cited by examiner

APPARATUSES AND METHODS FOR PERFORMING INFORMATION EXTRACTION AND INSERTION ON BITSTREAMS

TECHNICAL FIELD

Embodiments described relate to video encoding and decoding, and examples include performing information extraction and insertion on bitstreams.

BACKGROUND

Typically, signals, such as audio or video signals, may be digitally encoded for transmission to a receiving device. Video signals may contain data that is broken up in frames over time. Due to high bandwidth requirements, baseband video signals are typically compressed by using video encoders prior to transmission/storage. Video encoders may employ a coding methodology to encode macroblocks within a frame using one or more coding modes. In many video encoding standards, such as MPEG-1, MPEG-2, MPEG-4, H.261, H.262, H.263, H.264, HEVC, etc., a macroblock denotes a square region of pixels, which may be, for example, 16×16 pixels in size. Most of the coding processes (e.g. motion compensation, mode decision, quantization decision, etc.) occur at this level.

In high macroblock rate decoding, the video decode time (e.g., the time required to process on a macroblock basis) exceeds the current hardware capability. Thus, macroblock decoding is typically distributed over multiple processors for performing parallel decode. A high pixel (or macroblock) rate video decode is required for high resolution or high frame rate scenarios for digital cinema or faster than real-time decode. The performance of a decoder, however, is ultimately limited by the sequential nature of the video codec standard.

H.264 is a high complexity codec standard, which has both temporal and spatial dependencies. Normal methods to accelerate the decode macro block rate of H.264 are normally based on assumptions of multiple slices per frame to allow slice parallel decode, or frame parallel decode based on assumption of GOP structure and/or vertical motion vector component limits, or even GOP (scene) parallel methods. However these assumptions are not always true, such as in faster than real-time decode or wide aspect ratio UHD video. Problems may arise in slice parallel and picture parallel decode techniques. For example, in performing slice parallel decode on a CABAC bitstream, multiple slices per frame can cause video quality degradation. Parallel picture decode is also risky in that it requires the decoder to obtain information from every previous frame, which might not always be feasible. Therefore, it would be beneficial to provide systems and methods for performing information extraction and insertion on H.264 bitstreams, which would allow for wavefront parallel decode of the bitstreams.

Turning to the HEVC standard, while it has a configuration setting for supporting wavefront parallel processing (Wpp=1), the setting requires that the quantization parameter and CABAC be reset at the start of each macroblock row. Thus, turning on this setting to support wavefront parallel decode may result in lost video quality, and may be undesirable from a system perspective (e.g., for systems that split entropy decode and macroblock decode). Therefore, it would be beneficial to provide systems and methods for performing information extraction and insertion on HEVC bitstreams, which would allow for and/or improve wavefront parallel decode of the bitstreams.

DETAILED DESCRIPTION

Examples of methods and apparatuses for performing information extraction and insertion on bitstreams are described herein. Certain details are set forth below to provide a sufficient understanding of embodiments of the disclosure. However, it will be clear to one having skill in the art that embodiments of the disclosure may be practiced without these particular details, or with additional or different details. Moreover, the particular embodiments described herein are provided by way of example and should not be used to limit the scope of the disclosure to these particular embodiments. In other instances, well-known video components, encoder or decoder components, circuits, control signals, timing protocols, and software operations have not been shown in detail in order to avoid unnecessarily obscuring the disclosure.

Figure 1:
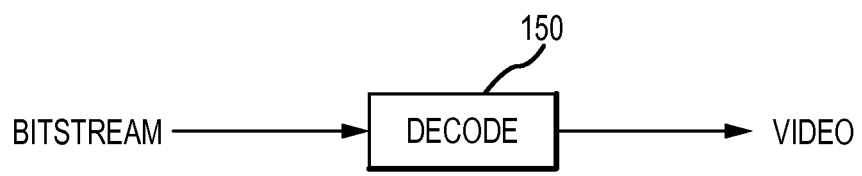
FIG. 1 is a schematic block diagram of a decoding apparatus, according to an embodiment of the disclosure.

FIG. 1 is a schematic block diagram of a decoding apparatus 100, according to an embodiment. The decoding apparatus 100 may perform information extraction and insertion on a bitstream to support, for example, wavefront parallel decoding of the bitstream. The decoding apparatus 100, which may be implemented in hardware, software, firmware, or combinations thereof, includes a decoder 150 that may include control logic, logic gates, processors, memory, and/or any combination or sub-combination of the same, and may be configured to decode and/or decompress a bitstream signal to produce video output using one or more decoding techniques, examples of which will be described further below.

The decoder 150 may be implemented in any of a variety of devices employing video decoding, including, but not limited to, televisions, broadcast systems, mobile devices, and both laptop and desktop computers. In at least one embodiment, the decoder 150 may include an entropy decoder, such as a variable-length coding decoder (e.g., a context-adaptive binary arithmetic coding (CABAC) decoder), and a macroblock decoder configured to decode data, for instance, at a macroblock level. Each macroblock may be decoded in intra-coded mode, inter-coded mode, bidirectionally, or in any combination or subcombination of the same.

As an example, the decoder 150 may receive and decode a video bitstream that, in one embodiment, may contain video data that has been encoded. The video data may be encoded in accordance with one or more encoding standards, such as MPEG-2, MPEG-4, H.263, H.264, and/or HEVC, to provide the encoded bitstream. The decoder 150 may decode the bitstream and output video data, which may be provided to a device (e.g., television, broadcast system, mobile device, computer, etc.) for presentation of the video content.

Figure 2:
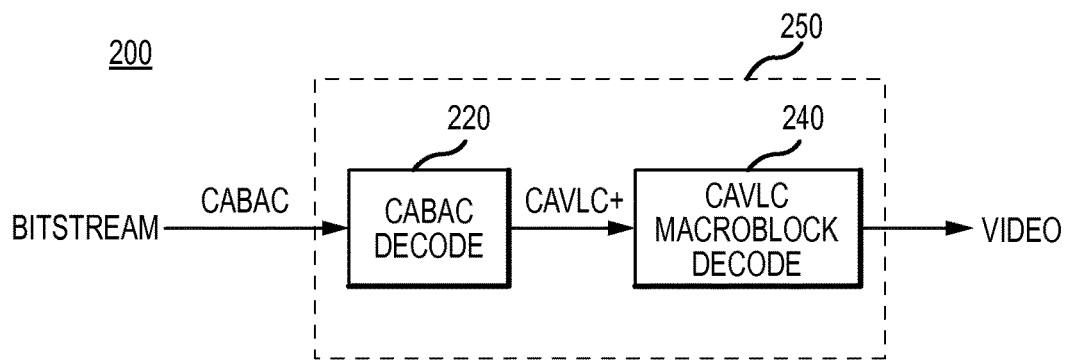
FIG. 2 is a schematic block diagram of a decoding apparatus, according to an embodiment of the disclosure.

FIG. 2 is a schematic block diagram of a decoding apparatus 200, according to an embodiment of the disclosure. The decoding apparatus 200 comprises a decoder 250, which may include an entropy decoder 220 for carrying out entropy decode, and a macroblock decoder 240 for carrying out parallel macroblock decode. The entropy decoder 220 may extract information (e.g., row entry point information) from and insert information into the video bitstream, and the macroblock 250 decoder may use the inserted information to perform wavefront parallel decode of the bitstream. The entropy decoder 220 may be a CABAC decoder configured to receive a CABAC bitstream and convert it to a context-adaptive variable-length coding (CAVLC) formatted output bitstream. The macroblock decoder 240 may include a plurality of CAVLC macroblock processors for carrying out wavefront parallel decode on the CAVLC bitstream.

Figure 3:
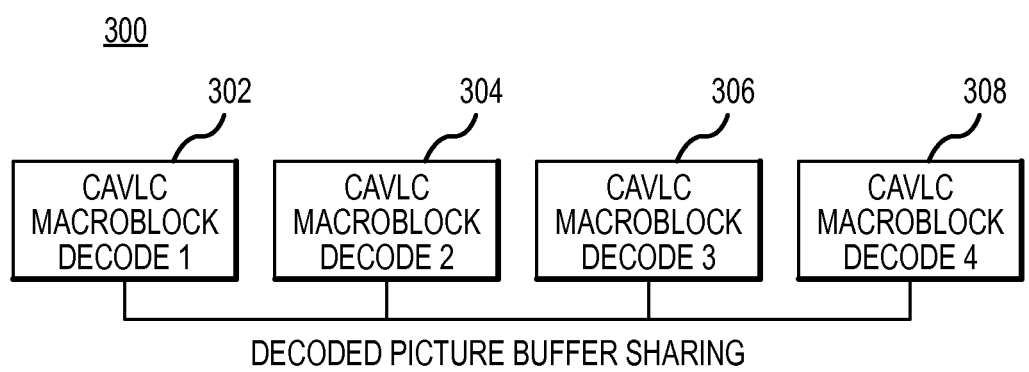
FIG. 3 is a schematic block diagram of macroblock decode processors for carrying out wavefront parallel decode of bitstreams, according to an embodiment of the disclosure.

FIG. 3 is a schematic block diagram that shows a macroblock decoder 300 comprising a plurality of CAVLC macroblock decode processors 302, 304, 306, 308, according to an embodiment of the disclosure. While FIG. 3 shows four decode processors 302, 304, 406, 308, it will be apparent to those in the art that four processors is exemplary, and the decoder 300 may include any number of decode processors while remaining within the scope of this disclosure. A CAVLC+ output bitstream, which may include content data plus row entry point information (e.g., inserted by CABAC decoder 220) may be distributed to the plurality of macroblock decode processors 302, 304, 306, 308. The decode processors 302, 304, 306, 308 may use the inserted entry point information for carrying out wavefront parallel decode. The macroblock decoder 300, together with the CAVLC bitstream, may support decoded picture buffer sharing among the plurality of macroblock decode processors 302, 304, 306, 308, in carrying out the wavefront parallel decode.

Figure 4:
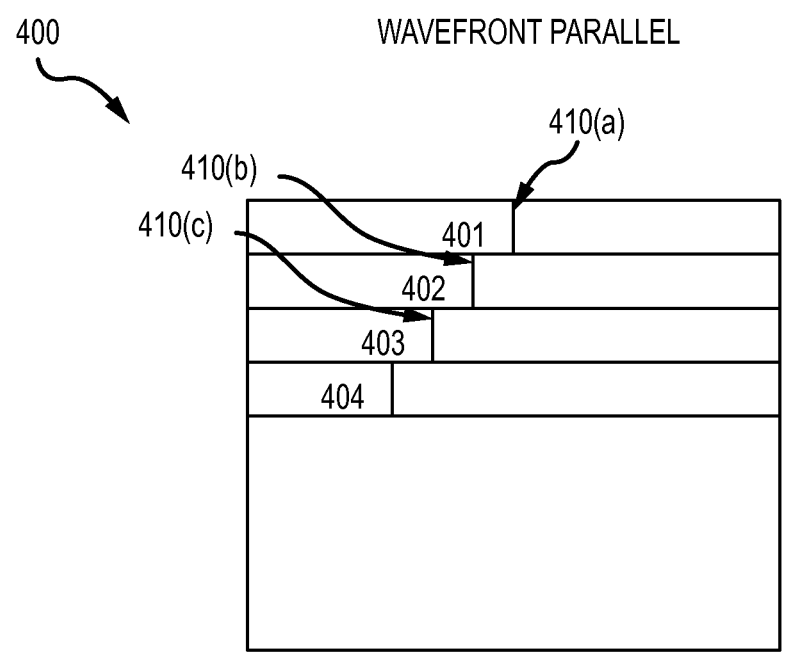
FIG. 4 shows a macroblock of a bitstream that is divided into rows, according to an embodiment of the disclosure.

FIG. 4 shows a frame 400 of a video bitstream that is divided into rows. In performing wavefront parallel decode on the frame 400, decoder 300 may decode a row 401 in the frame 400 (e.g., with one of the processors 302, 304, 306, 308), then starts to decode another row 402 shortly after beginning to decode the first row 401 (e.g., with another one of the processors 302, 304, 306, 308) then starts to decode the third row 403 shortly after beginning to decode the second row 402 (e.g., with another one of the processors 302, 304, 306, 308), and so forth. As such, the decoding appears to proceed along a "wavefront" as, for example, each row's decoding process may be a set amount ahead of the next row's decoding. In starting to decode each row, a processor 302, 304, 306, 308 may start at a row entry point (e.g. 410 (a), 410 (b), 410(c)). In the context of CABAC and CAVLC decoding for H.264 and HEVC, at least the entropy decoding is performed in series. For example, CABAC decoding is sequential in nature, so each one of the plurality of the macroblock decode processors 302, 304, 306, 308 may need to read row entry point information (e.g., which bit is the starting bit for the row) in order to determine where the wave will begin for the parallel decode (e.g., to determine where in the bitstream the portion of data is located). Thus, in preferred embodiments, the disclosed systems and methods make available to each macroblock decode processor 302, 304, 306, 308, which is decoding a particular row (e.g., 402), the location of the row entry point for that row (e.g., the bit count entry data of 410(b)). Thus, each of the plurality of macroblock decoder processors 302, 304, 306, 308 can determine where in the bitstream the portion of data is that it is decoding, and thus carry out the wavefront parallel decode.

Figure 5:
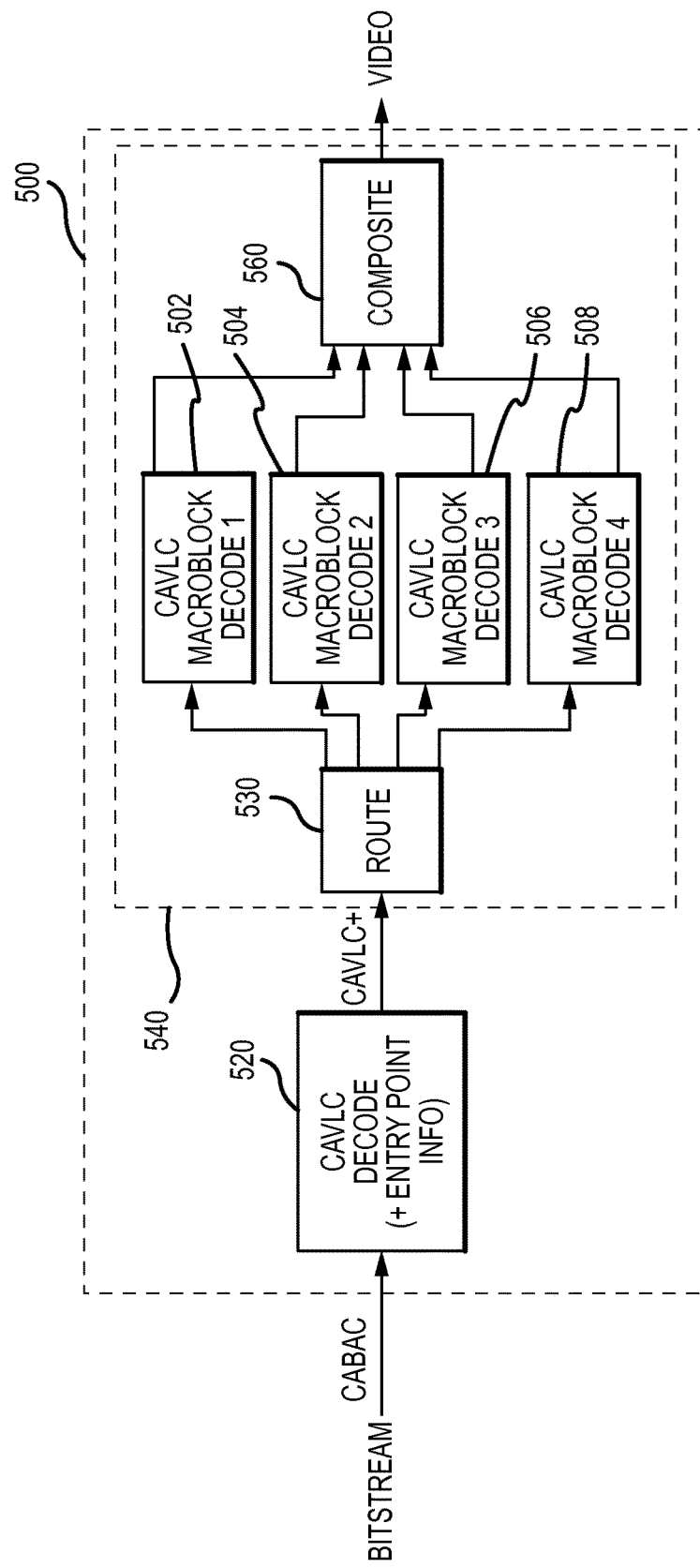
FIG. 5 is a schematic block diagram of a decoding apparatus, according to an embodiment of the disclosure.

FIG. 5 is a schematic block diagram of a decoding apparatus 500, according to an embodiment. The decoding apparatus 500 may include an entropy decoder (e.g., CABAC decoder) 520 that carries out CABAC decoding on a bitstream, while performing information extraction and insertion on the bitstream, and outputs a CAVLC output bitstream that contains the entry point information. The decoding apparatus 500 may include a macroblock decoder 540 that uses the entry point information contained within the CAVLC output bitstream to perform wavefront parallel decode. The macroblock decoder 540 may include a plurality of macroblock decode processors 502, 504, 506, 508 (e.g., CAVLC macroblock decode processors). As will be apparent to those in the art, while FIG. 5 shows four macroblock processors 502, 504, 506, 508, this number is exemplary and the macroblock decoder 540 may include any number of macroblock processors while remaining within the scope of this disclosure. The CABAC decode 520 may operate at a bit rate, and the macroblock decoder 540 may operate at a macroblock speed. The CABAC decoder 520 and macroblock decoder 540 may be linked by a re-ordable data format (e.g., a CAVLC bitstream), which may act as a buffer.

In performing the CABAC decode and creating the CAVLC output bitstream, the CABAC decoder 520 determines an entry point for each row in the macroblock. Those in the art will appreciate that this determination may be necessary to carry out the CABAC decode, so this determination does not require further processing steps. Entry point information, including row entry pointers (indicative of these entry points) may be inserted into the CAVLC output bitstream, which may be sent to the macroblock decoder 540. In this manner, the row entry information may be embedded in the output bitstream. The macroblock decoder 540 may use these row entry pointers to perform wavefront parallel macroblock decode. The row entry pointer may point to the bit count entry for a row in the macroblock. In some embodiments, the bit count entry indicates the starting bit in the row, although this disclosure is not limited thereto.

The bitstream comprises a plurality of data network adaptation layer (NAL) units, and each NAL unit may be associated with a particular row in a macroblock. When decoding a NAL unit for a row in the macroblock, the CABAC decoder 520 may determine bit count entry for the row, and insert a row entry point (indicative of the bit count entry) into the NAL unit, which is outputted as an output bitstream (e.g., CAVLC+ bitstream). Router 530 may distribute the bitstream to the various macroblock decode processors 502, 504, 506, 508 for performing wavefront parallel decode.

In some embodiments, the router 530 sends the entire bitstream to each macroblock decode processors 502, 504, 506, 508. In such cases, the processors 502, 504, 506, 508 may go to the headers for the NAL units and read the row entry point information (including the row entry pointers, indicative of the bit count entry) to determine which particular NAL units to decode. In some embodiments, the router 530 divides the bitstream up (e.g., by NAL units) and sends certain NAL units to each of the macroblock decode processors 502, 504, 506, 508. For example, the router 530 may look at the header for each NAL unit and read the entry point information to determine which macroblock decode processor 502, 504, 506, 508 to send the particular NAL unit.

Upon receiving a NAL unit, the decode processors 502, 504, 506, 508 can utilize the entry point information to determine the sequential parameters of the NAL unit within the output CAVLC+ bitstream and carry out the wavefront parallel decode. In performing the wavefront parallel decode, the macroblock decode processors 502, 504, 506, 508 can decode the NAL header (which contains the entry point information), read the row entry pointer to determine the row entry point (bit count entry), and then, based on this determination, advance to the row entry point and commence the macroblock decode. In carrying out the macroblock decode, the decoder 240 may receive spatial information from an above right processor and pass information to the below left processor so that wavefront parallel processing can occur. The parallel decode processors 502, 504, 506, 508 may output the decoded bitstream to a composite 560, which may put together the rows for creating a video content image.

Figure 6:
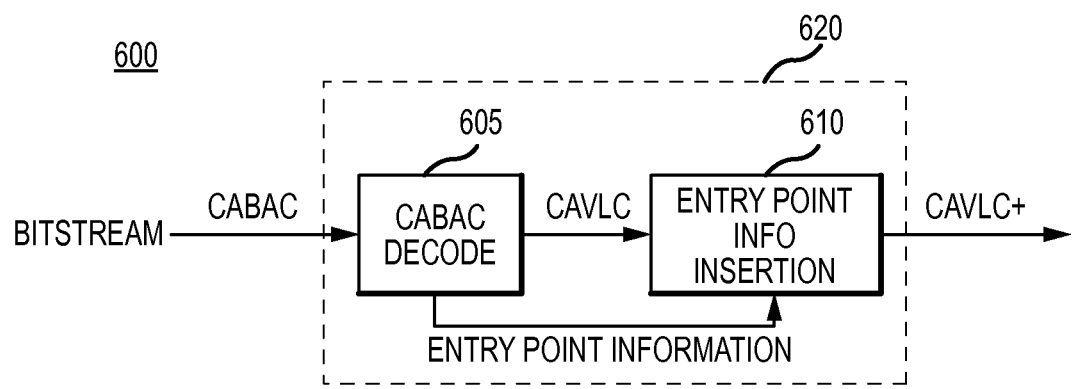
FIG. 6 is a schematic block diagram of a decoding apparatus, according to an embodiment of the disclosure.

FIG. 6 is a schematic block diagram of a decoding apparatus including a decoder 620, according to an embodiment of the disclosure. The decoder 620 may include a CABAC decode block 605, which includes an extraction block. The CABAC decode block 605 may receive the CABAC bitstream and carry out the CABAC decode. In carrying out the CABAC decode, the CABAC decode block 605 may determine and extract (via the extraction block) row entry point information for the NAL units. The CABAC decode block 605 may send this entry point information to a memory, such as a FIFO, and send the CAVLC bitstream to the insertion block 640. The insertion block 640 may receive the CAVLC bitstream, read the entry point information from the memory, and insert the entry point information into the NAL corresponding units. The insertion block 640 may output a CAVLC+ bitstream, which may include NAL units, each containing row data for a corresponding row, plus the row entry point information.

The entry point information may include information indicating which bit is the entry bit for the row (e.g., bit count entry data). In some embodiments (e.g., for cases employing the H.264 standard) other information may also be inserted into the NAL unit, such as a quantization parameter and skip-run data (e.g., data indicating how many macroblocks have been skipped). The quantization parameter may be taken from a macroblock that was previously decoded. A pointer indicating a new row and a pointer indicating the end of the slice may also be written into the NAL unit. In some embodiments (e.g., for cases employing the HEVC standard) a quantization parameter and skip-run data need not be inserted into the NAL unit.

Figure 7A:
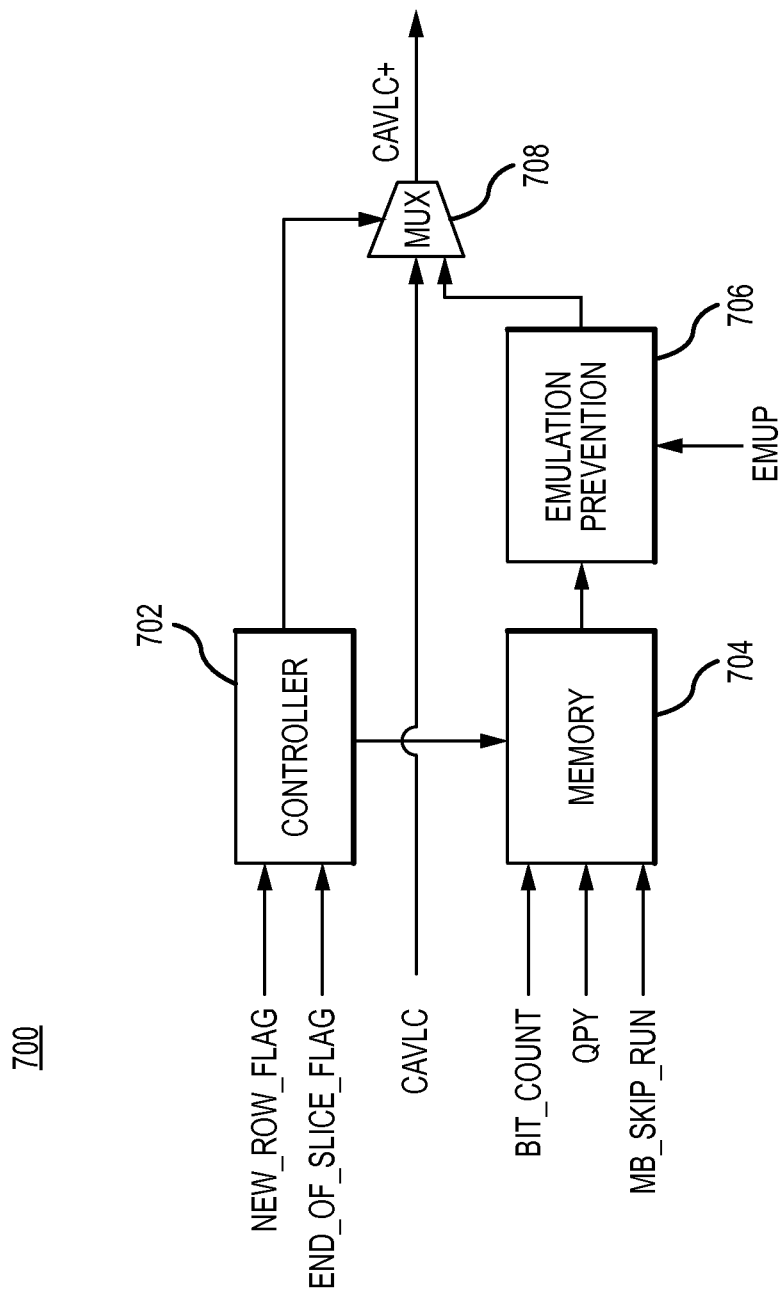
FIG. 7A is a schematic block diagram of a decoding apparatus, according to an embodiment of the disclosure.

In the disclosed systems and methods, the entry point information may be inserted into the NAL unit in such a fashion that makes it hidden to a decoder (so not to interfere with the decoding process), yet is easily accessible to the decoder. FIG. 7A is a schematic block diagram of a decoding system 700 that performs entry point information insertion and emulation prevention, according to an embodiment of the disclosure (e.g., for systems employing the H.264 standard). In some embodiments, the entry point information (e.g., bit count entry data, quantization parameter, and skip run data), which was extracted during the CABAC decode, is saved as data in the memory 704. An emulation prevention block 706 performs emulation prevention on this data (the details of which are described below with reference to FIG. 9), and the data is written into the NAL unit with multiplexer 708. Controller 702 may receive the pointers indicating the new row and the end of the slice, and the controller 702 may use these pointers to write the data into the memory 704 and into the NAL unit.

Figure 7B:
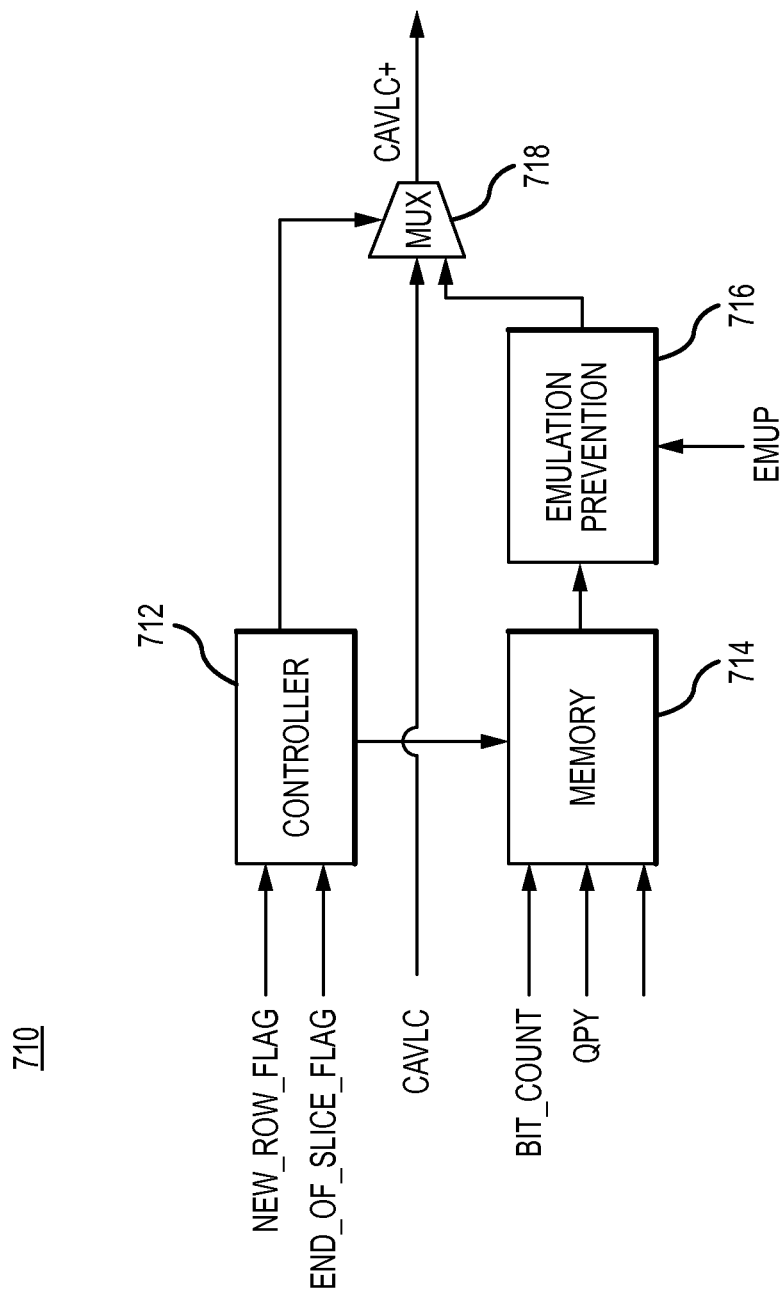
FIG. 7B is a schematic block diagram of a decoding apparatus, according to an embodiment of the disclosure.

FIG. 7B is a schematic block diagram of a decoding system 710 that performs entry point information insertion and emulation prevention, according to an embodiment of the disclosure (e.g., for systems employing the HEVC standard). In some embodiments, the entry point information (e.g., bit count entry data), which was extracted during the CABAC decode, is saved as data in the memory 714. An emulation prevention block 716 performs emulation prevention on this data (the details of which are described below with reference to FIG. 9), and the data is written into the NAL unit with multiplexer 718. Controller 712 may receive the pointers indicating the new row and the end of the slice, and the controller 712 may use these pointers to write the data into the memory 714 and into the NAL unit.

Figure 8:
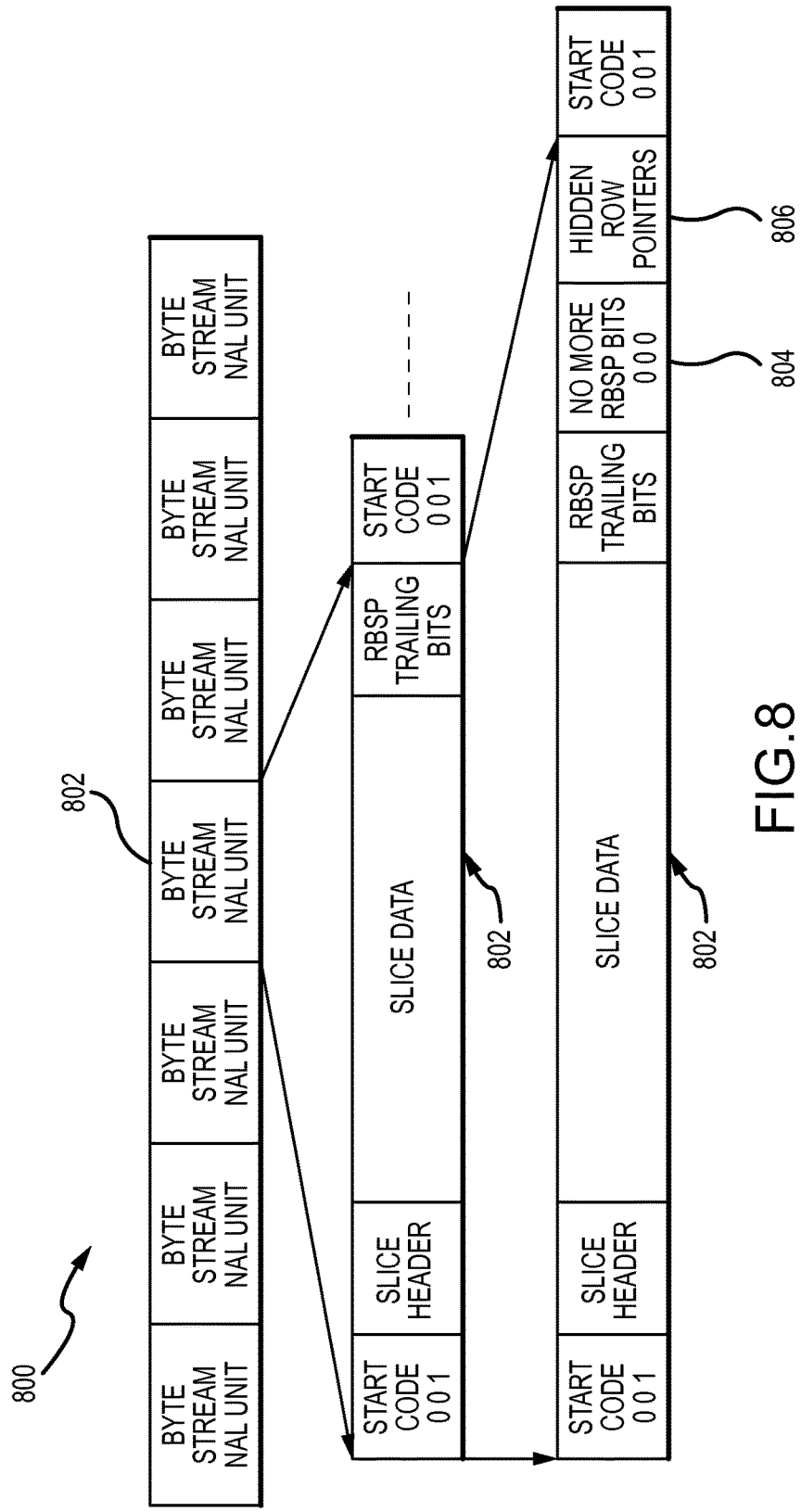
FIG. 8 is a schematic illustration of a plurality of NAL units, showing an insertion of information into one of the NAL units, according to an embodiment of the disclosure.

FIG. 8 shows a bitstream containing a plurality of NAL units, according to an embodiment. As shown, in inserting the row entry point information, the decoder 520 may insert a (0 0 0) 804 into the NAL unit 802, to indicate the end of the row data. The (0 0 0) 804 indicates to the macroblock decoder 540 that the row data has ended, so the decoder does not mistake the entry point information for further row data. The entry point information (including the row entry pointer 806) may be inserted after the (0 0 0) 804 and before the start code for a subsequent NAL unit. Thus, the macroblock decoder 540 may parse the entry point information backwards from the NAL unit end, without having to decode the entire NAL unit.

Figure 9:
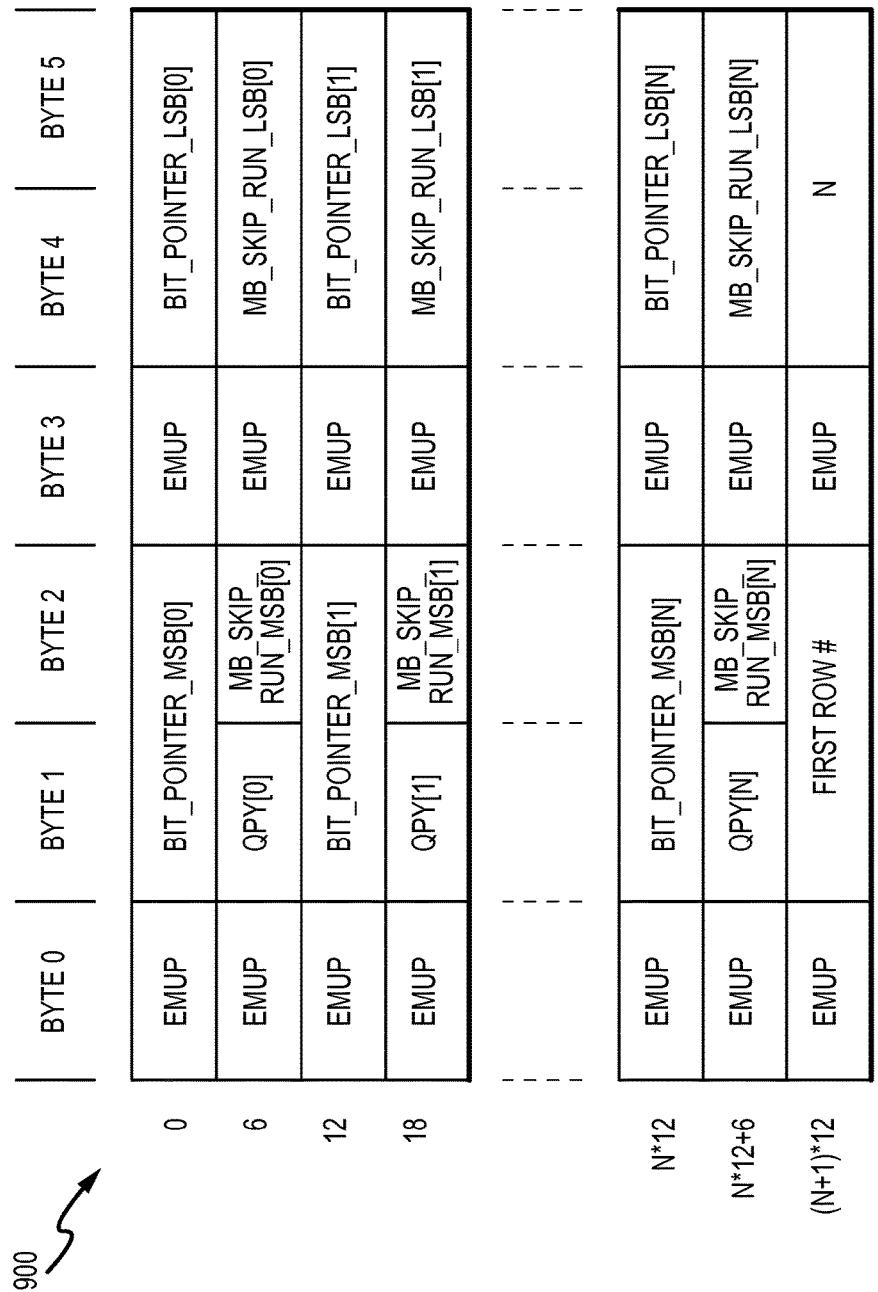
FIG. 9 is a schematic illustration of an emulation prevention technique, according to an embodiment of the disclosure.

Emulation prevention may be carried out so that the decoder does not mistakenly interpret the entry point information as a start code for a subsequent NAL unit. Emulation prevention may take on various embodiments. Referring to FIG. 9, in some embodiments, emulation prevention is carried out by inserting into the entry point information a single emulation prevention byte (EMUP) having a value that is not used as a start code (e.g., having a value that is not 0, 1, 2, or 3). For example, for cases in which the start code for a NAL unit is (0, 0, 1), emulation prevention may ensure that three consecutive bytes within the entry point information are never (0, 0, 1). Thus, in carrying out the emulation prevention, an integer that is not equal to 0, 1, 2, or 3 may be inserted into every third byte of the entry point information. Thus, this technique of emulation prevention ensures that the entry point information will not include consecutive (0 0 1) so to trigger a new start code, and the EMUP bytes can simply be removed by the macroblock decoder during bitstream decoding.

The disclosed decoder may perform wavefront parallel decode on, for instance H.264 or HEVC, without requiring addition side band information, and using any compliant decoder as part of system validation.

Figure 10:
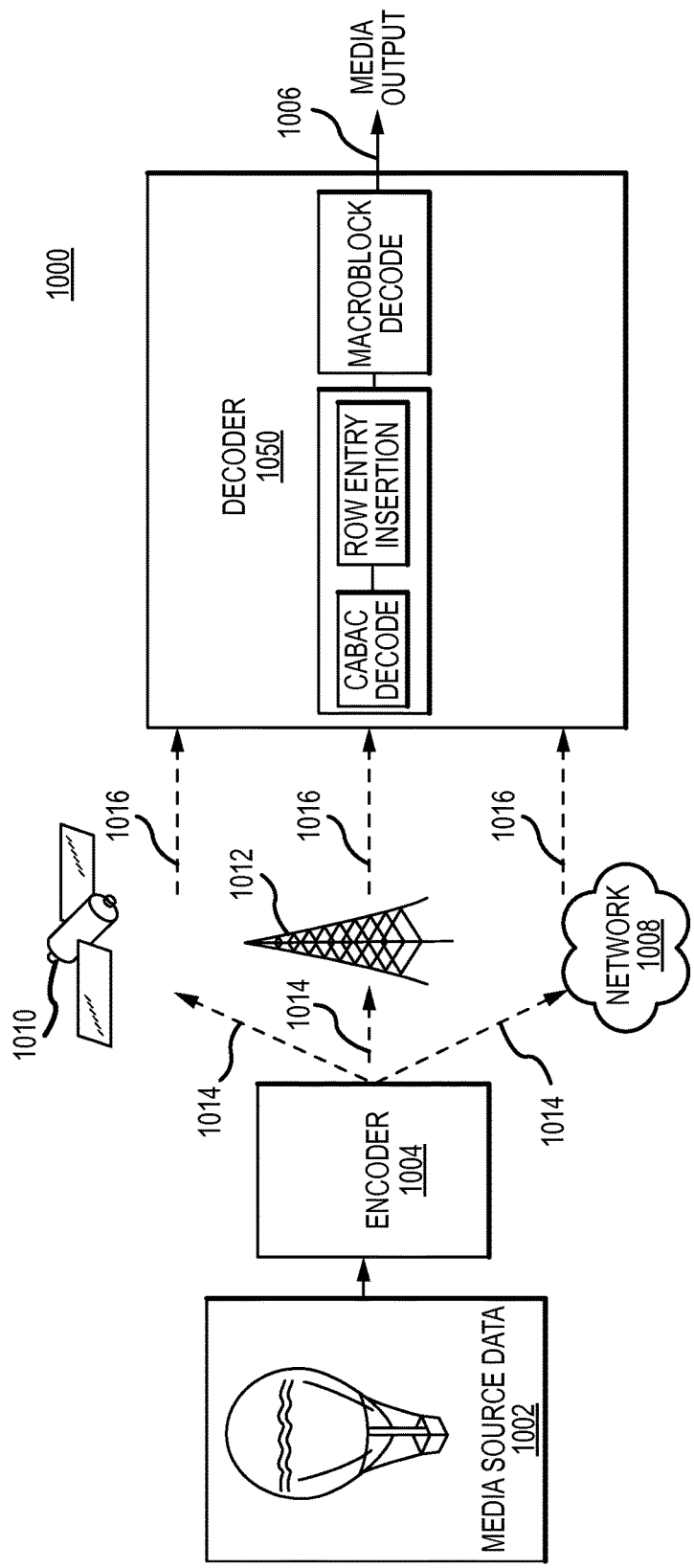
FIG. 10 is a schematic illustration of a media delivery system in accordance with embodiments.

FIG. 10 is a schematic illustration of a media delivery system in accordance with embodiments. The media delivery system 1000 may provide a mechanism for delivering a media source 1002 to one or more of a variety of media output(s) 1006. Although only one media source 1002 and media output 1006 are illustrated in FIG. 10, it is to be understood that any number may be used, and examples may be used to broadcast and/or otherwise deliver media content to any number of media outputs.

The media source data 1002 may be any source of media content, including but not limited to, video, audio, data, or combinations thereof. The media source data 1002 may be, for example, audio and/or video data that may be captured using a camera, microphone, and/or other capturing devices, or may be generated or provided by a processing device. Media source data 1002 may be analog or digital. When the media source data 1002 is analog data, the media source data 1002 may be converted to digital data using, for example, an analog-to-digital converter (ADC). Typically, to transmit the media source data 1002, some type of compression and/or encryption may be desirable. Accordingly, an encoder with joint rate-distortion optimization 1004 may be provided that may encode the media source data 1002 using any encoding method in the art, known now or in the future, including encoding methods in accordance with video standards such as, but not limited to, MPEG-2, MPEG-4, H.264, HEVC, or combinations of these or other encoding standards.

The encoded data 1014 may be provided to a communications link, such as a satellite 1010, an antenna 1012, and/or a network 1008. The network 1008 may be wired or wireless, and further may communicate using electrical and/or optical transmission. The antenna 1012 may be a terrestrial antenna, and may, for example, receive and transmit conventional AM and FM signals, satellite signals, or other signals known in the art. The communications link may broadcast the encoded data 1014, and in some examples may alter the encoded data 1014 and broadcast the altered encoded data 1014 (e.g., by re-encoding, adding to, or subtracting from the encoded data 1014). The encoded data 1016 provided from the communications link may be received by a receiver that may include or be coupled to a decoder 1050. The decoder 1050 may decode the encoded data 1016 to provide one or more media outputs, with the media output 1006 shown in FIG. 10. A decoder for performing wavefront parallel decode of video bitstreams may be implemented using any decoder described herein, including the decoding systems and components thereof as shown in FIGS. 1-3 and 5-9.

The decoder 1050 may be included in or in communication with any number of devices, including but not limited to a modem, router, server, set-top box, laptop, desktop, computer, tablet, mobile phone, etc. The media delivery system 1000 of FIG. 10 and/or the decoder for extracting and inserting information into bitstreams may be utilized in a variety of segments of a content distribution industry.

Figure 11A:
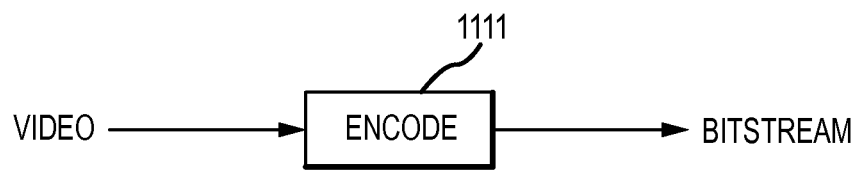
FIG. 11A is a schematic block diagram of an encoding apparatus, according to an embodiment.

FIG. 11A is a schematic block diagram of an encoding apparatus 1101, according to an embodiment. The encoding apparatus 1001 may perform information extraction and insertion on a bitstream to support, for example, decoding of the bitstream by any suitable decoder. The encoding apparatus 1101, which may be implemented in hardware, software, firmware, or combinations thereof, may include an encoder 1111 that may include control logic, logic gates, processors, memory, and/or any combination or sub-combination of the same, and may be configured to encode and/or compress a video signal to produce bitstream output using one or more encoding techniques, examples of which will be described further below.

The encoder 1111 may be implemented in any of a variety of devices employing video decoding, including, but not limited to, televisions, broadcast systems, mobile devices, and both laptop and desktop computers. In at least one embodiment, the encoder 1111 may include an entropy encoder, such as a variable-length coding decoder (e.g., a context-adaptive binary arithmetic coding (CABAC) decoder). Each macroblock may be encoded in intra-coded mode, inter-coded mode, bidirectionally, or in any combination or subcombination of the same.

As an example, the encoder 1111 may receive and encode a video signal that, in one embodiment, may contain video data that has been encoded. The video data may be encoded in accordance with one or more encoding standards, such as MPEG-2, MPEG-4, H.263, H.264, and/or HEVC, to provide the encoded bitstream. The output bitstream encoded by the encoder 1111 may be provided to a device (e.g., television, broadcast system, mobile device, computer, etc.) for presentation of the video content.

Figure 11B:
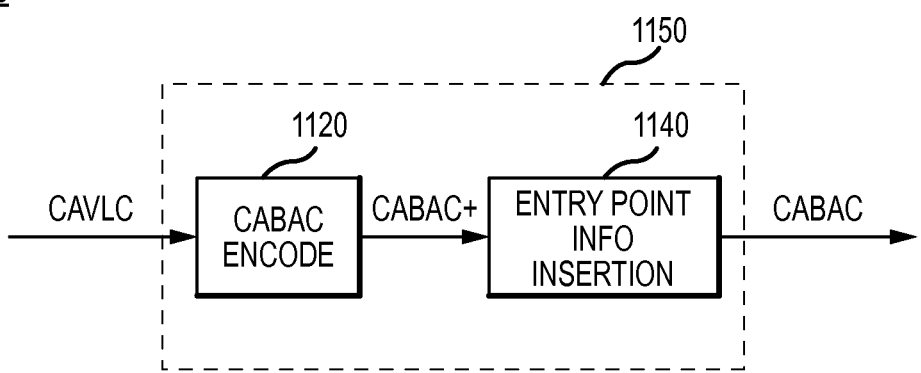
FIG. 11B is a schematic illustration of an encoding apparatus, according to an embodiment of the disclosure.

FIG. 11B is a schematic block diagram of an encoding apparatus 1100, according to an embodiment of the disclosure. The encoding apparatus 1100 comprises an encoder 1150, which may include a CABAC encoder for receiving a CAVLC bitstream and outputting a bitstream (e.g., an HEVC CABAC bitstream, where entry point information is missing from the slice header, as it cannot be known until the complete NAL has been converted to CABAC, thus the entry point information is appended as CABAC+, until it can be inserted into the slice header in the future in an HEVC compliant CABAC bitstream with wpp=1), and an information insertion block 1140 for extracting the entry point information from the CABAC+ stream and then inserting entry point information into the CABAC bitstream NAL header and output a CABAC output bitstream. The CABAC output bitstream may be configured to be received and decoded by any suitable decoder. For example, the CABAC output bitstream may be configured to be received by a macroblock decoder for performing parallel macroblock decode on the bitstream. The CABAC encoder 1120 may include an extraction block that determines and extracts row entry point information from the NAL units of the bitstream during the CABAC decode. The CABAC encoder 1120 may send this entry point information to a memory, such as a FIFO, and send the CABAC bitstream to the insertion block 1140.

The insertion block 1140 may receive the CABAC bitstream, read the entry point information from the memory (together a CABAC+ stream), and insert the entry point information into the corresponding NAL units. The insertion block 1140 may output a CABAC bitstream, which may include NAL units, each containing content data for a corresponding row, plus the row entry point information.

The entry point information may include information indicating which bit is the entry bit for the row (e.g., bit count entry data). A pointer indicating a new row and a pointer indicating the end of the slice may also be written into the NAL unit.

Figure 12:
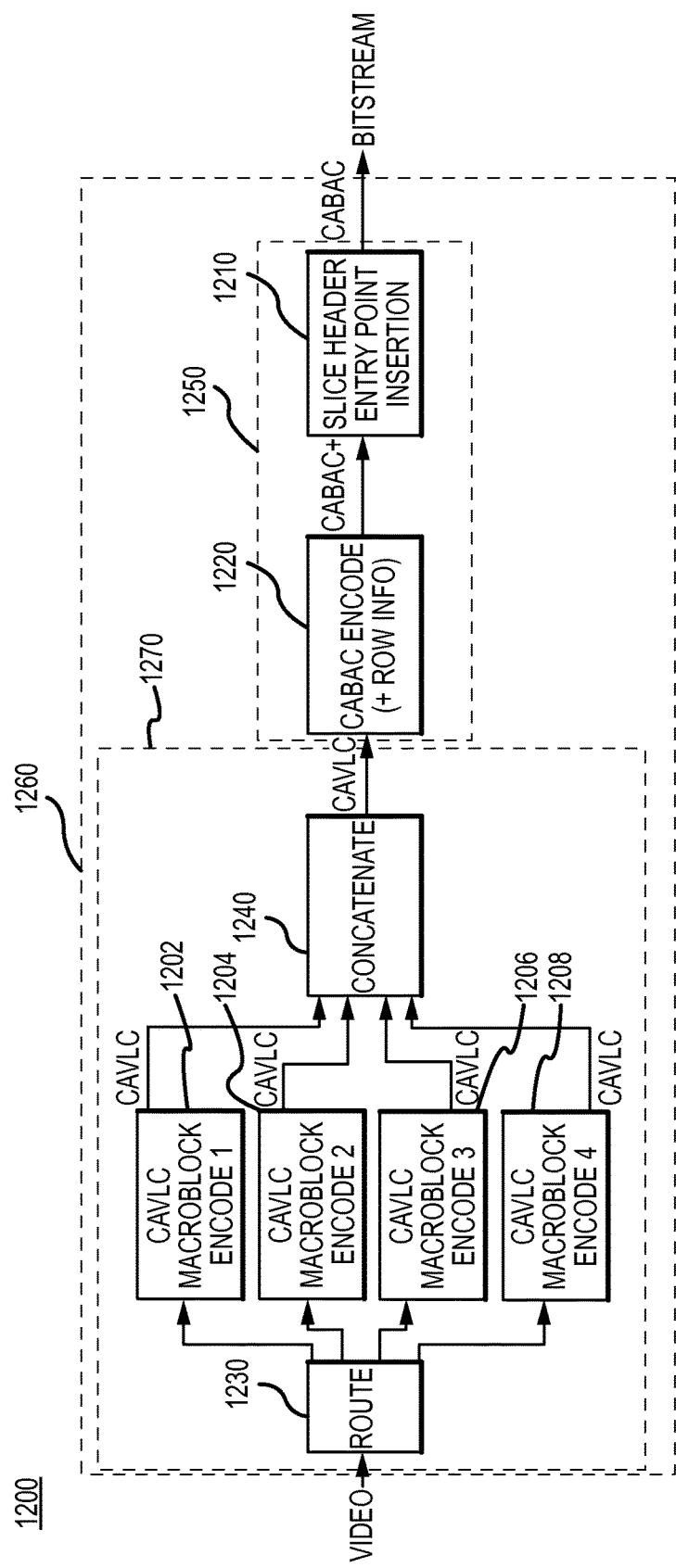
FIG. 12 is a schematic illustration of an encoding apparatus, according to an embodiment of the disclosure.

FIG. 12 is a schematic block diagram of an encoding apparatus 1200, according to an embodiment. The encoding apparatus 1200 may include an entropy encoder (e.g., CABAC encoder) 1250 that performs CABAC encoding, as well as entry point information extraction and insertion on a CAVLC bitstream, and outputs a CABAC output bitstream that contains the entry point information. The CABAC output bitstream may be sent to a decoder, which may use the entry point information to carry out any suitable type of decode (e.g., wavefront parallel decode).

The encoding apparatus 1200 may include a macroblock encoder 1270 that receives a video signal, performs CAVLC encode on it (e.g., parallel CAVLC encode), and outputs a CAVLC bitstream to the CABAC encoder 1250. The macroblock encoder 1270 may include a plurality of macroblock encode processors 1202, 1204, 1206, 1208 (e.g., CAVLC macroblock encode processors). Router 1230 may distribute the video signal to the macroblock decode processors 1202, 1204, 1206, 1208 for performing parallel encode. As will be apparent to those in the art, while FIG. 12 shows four macroblock processors 1202, 1204, 1206, 1208, this number is exemplary and the macroblock encoder 1270 may include any number of macroblock processors while remaining within the scope of this disclosure. The macroblock encoder 1270 may operate at macroblock speed, and the CABAC encoder 1250 may operate at a bit rate. The macroblock encoder 1270 and CABAC encoder 1250 may be linked by a re-ordable data format (e.g., a CAVLC bitstream), which may act as a buffer.

In performing the CABAC encode and creating the CABAC output bitstream, the CABAC encoder 1220 determines an entry point for each row in the macroblock. This determination may be necessary to carry out the CABAC encode, so this determination does not require further processing steps in some examples. Row entry pointers (indicative of these entry points) may be inserted into the CABAC output bitstream, which may be sent to a macroblock decoder. A macroblock decoder may use these row entry pointers to perform wavefront parallel macroblock decode. The row entry pointer may point to the bit count entry for a row in the macroblock. In some embodiments, the bit count entry indicates the starting bit in the row, although this disclosure is not limited thereto.

The bitstream comprises a plurality of data network adaptation layer (NAL) units, and each NAL unit may be associated with a particular row in a macroblock. When encoding a NAL unit for a row in the macroblock, the CABAC encoder 1250 may determine entry point information for the row, and insert the entry point information into the NAL unit, which is outputted as an output bitstream (e.g., CABAC+ bitstream). Upon receiving a NAL unit, a decoder can utilize the entry point information to determine the sequential parameters of the NAL unit within the output CABAC+ bitstream and carry out wavefront parallel decode. In performing the wavefront parallel decode, a macroblock decode processors can decode a NAL header (which contains the entry point information) to determine the row entry point, and then, based on this determination, advance to the row entry point and commence the macroblock decode.

In the disclosed systems and methods, the entry point information may be inserted into the NAL unit in such a fashion that makes it hidden to a decoder (so not to interfere with the decoding process), yet is easily accessible to the decoder, or may be inserted into the CABAC bitstream in a compliant fashion (e.g., HEVC) where entry point information is part of the compliant CABAC format when wpp=1

The macroblock encoder 1270 may include a plurality of CAVLC macroblock processors 1202, 1204, 1206, 1208 for carrying out wavefront parallel encode on the video signal and outputting the CAVLC bitstream.

Figure 13:
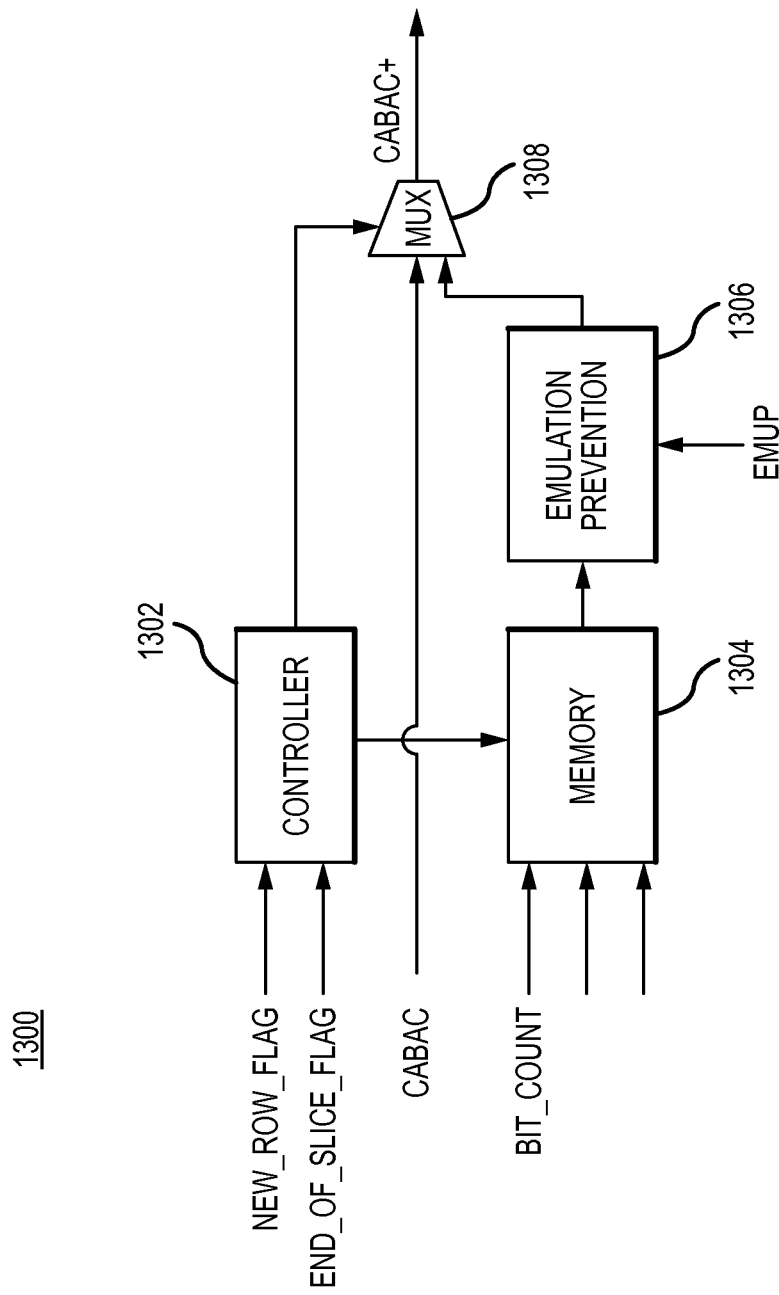
FIG. 13 is a schematic illustration of an encoding apparatus, according to an embodiment of the disclosure.

FIG. 13 is a schematic block diagram of an encoding apparatus 1300 that performs entry point information insertion and emulation prevention, according to an embodiment of the disclosure (e.g., for systems employing the HEVC standard). In some embodiments, the entry point information (e.g., bit count entry data), which was extracted during the CABAC encode, is saved as data in the memory 1304. An emulation prevention block 1306 performs emulation prevention on this data. The emulation prevention may be carried out similarly as the technique described with reference to FIG. 9, so it will not be described again in detail. The data (e.g., bit count entry, and pointers indicating a new row and an end of slice) is written into the NAL unit with multiplexer 1308. Controller 1302 may receive the pointers indicating the new row and the end of the slice, and the controller 1302 may use these pointers to write the data into the memory 1304 and into the NAL unit. During later processing the entry point information may be extracted and then written into the NAL unit headers to create, for instance, an HEVC CABAC bitstream. For cases in which the output bitstream is an HEVC bitstream, the wavefront parallel processing configuration setting may be turned on (e.g., Wpp=1), and the bitstream may be decoded by a wavefront parallel decoder through a clean implementation.

Figure 14:
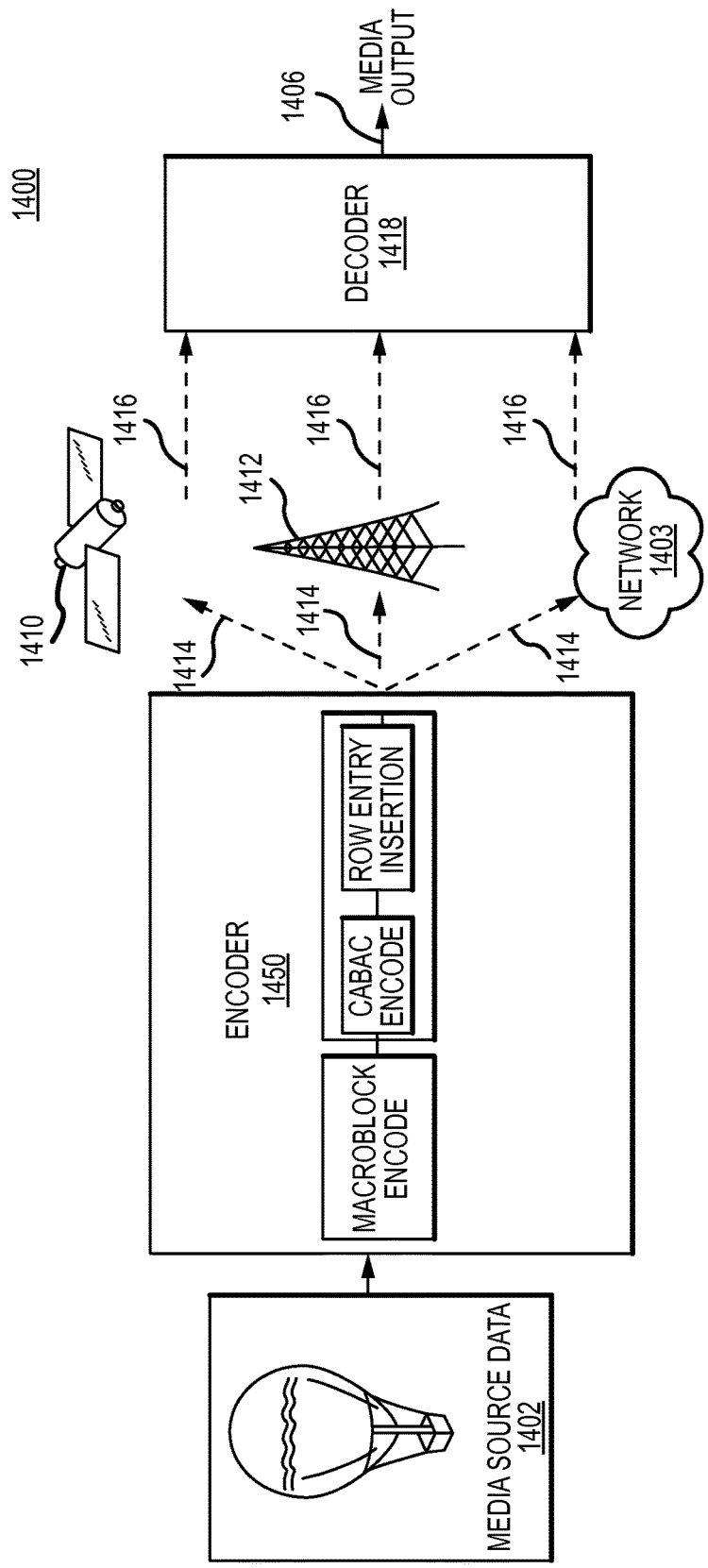
FIG. 14 is a schematic illustration of a media delivery system according to an embodiment of the invention.

FIG. 14 is a schematic illustration of a media delivery system according to an embodiment of the invention. The encoder 1450 may perform extracting and inserting information on a bitstream, as described in the any of the various embodiments described herein, including the encoding systems and components thereof as shown in FIGS. 11A-13. The decoder 1418 may be any suitable decoder. For example, the decoder 1418 may perform parallel decode, although other decoding techniques are also suitable. Other components shown in FIG. 14 are similar to those disclosed with reference to FIG. 10, the details of which will not be repeated.

The encoder 1450 may be included in or in communication with any number of devices, including but not limited to a modem, router, server, set-top box, laptop, desktop, computer, tablet, mobile phone, etc. The media delivery system 1400 of FIG. 14 and/or the encoder for extracting and inserting information into bitstreams may be utilized in a variety of segments of a content distribution industry.

Accordingly, encoding, transcoding, and/or decoding may be utilized at any of a number of points in a video distribution system. Embodiments may find use within any, or in some examples all, of these segments.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus comprising:
   a first circuit configured to (i) generate an intermediate bitstream by entropy transcoding an input bitstream, wherein (a) the input bitstream represents a video signal, (b) the input bitstream is a context-adaptive binary arithmetic coding (CABAC) bitstream, (c) the intermediate bitstream is a context-adaptive variable-length coding (CAVLC) bitstream, (d) the intermediate bitstream contains a plurality of data network adaptation layer (NAL) units, and (e) each NAL unit is associated with a plurality of rows of macroblocks in the video signal and (ii) extract a plurality of count values from the input bitstream during the entropy transcode to the intermediate bitstream, wherein the count values identify a start of each of the rows of macroblocks in the NAL units; and a second circuit configured to generate an output bitstream by inserting entry point information into the NAL units, wherein (a) the output bitstream is a modified CAVLC bitstream, (b) the modified CAVLC bitstream comprises (i) a CAVLC bitstream, (ii) an end-of-row data code inserted after a trailing bits field of each NAL unit and (iii) the entry point information inserted in each NAL unit in an additional field adjoining both the end-of-row-data code and a start code for a subsequent NAL unit, (c) the entry point information comprises the count values and one or more emulation prevention elements, (d) the NAL units of the output bitstream are suitable to decode in a plurality of macroblock decoders using the count values and a wavefront parallel decoding technique, and (e) the additional field allows the macroblock decoders to parse the entry point information from the end of the NAL unit without needing to decode the entire NAL unit.

2. The apparatus of claim 1, wherein the count values are usable by the macroblock decoders to decode the output bitstream for each of the rows of macroblocks independently of decoding other rows of macroblocks.

3. The apparatus of claim 1, wherein the second circuit is further configured to insert a quantization parameter and skip-run data into the additional field in the NAL units of the intermediate bitstream.

4. The apparatus of claim 1, further comprising the macroblock decoders configured to decode the output bitstream in a diagonal wavefront.

5. The apparatus of claim 1, wherein the additional fields are inserted at an end of the NAL units of the intermediate bitstream.

6. The apparatus of claim 1, wherein the emulation prevention elements are configured to prevent the macroblock decoders from interpreting the entry point information as the start code for the subsequent NAL unit.

7. The apparatus of claim 6, wherein the emulation prevention is performed by inserting an integer at every third byte of the count values.

8. A method for bitstream decoding comprising the steps of:
generating an intermediate bitstream by entropy transcoding an input bitstream, wherein (a) the input bitstream represents a video signal, (b) the input bitstream is a context-adaptive binary arithmetic coding (CABAC) bitstream, (c) the intermediate bitstream is a context-adaptive variable-length coding (CAVLC) bitstream, (d) the intermediate bitstream contains a plurality of network adaptation layer (NAL) units, and (e) each NAL unit is associated with a plurality of rows of macroblocks in the video signal;
extracting a plurality of count values from the input bitstream during the entropy transcode to the intermediate bitstream, wherein the count values identify a start of each of the rows of macroblocks in the NAL units; and
generating an output bitstream by inserting entry point information into the NAL units, wherein (a) the output bitstream is a modified CAVLC bitstream, (b) the modified CAVLC bitstream comprises (i) a CAVLC bitstream, (ii) an end-of-row data code inserted after a trailing bits field of each NAL unit and (iii) the entry point information inserted in each NAL unit in an additional field adjoining both the end-of-row-data code and a start code for a subsequent NAL unit, (c) the entry point information comprises the count values and one or more emulation prevention elements, (d) the NAL units of the output bitstream are suitable to decode in a plurality of macroblock decoders using the count values and a wavefront parallel decoding technique, and (e) the additional field allows the macroblock decoders to parse the entry point information from the end of the NAL unit without needing to decode the entire NAL unit.

9. The method of claim 8, wherein the count values are usable by the macroblock decoders to decode the output bitstream for each of the rows of macroblocks independently of decoding other rows of macroblocks.

10. The method of claim 8, further comprising the step of:
inserting a quantization parameter and skip-run data into the additional fields in the NAL units of the intermediate bitstream.

11. The method of claim 8, further comprising the step of:
decoding the output bitstream in a diagonal wavefront.

12. The method of claim 8, wherein the additional fields are inserted at an end of the NAL units of the intermediate bitstream.

13. The method of claim 8, wherein:
the emulation prevention elements are configured to prevent the macroblock decoders from interpreting the entry point information as the start code for the subsequent NAL unit.

14. The method of claim 13, wherein the emulation prevention is performed by inserting an integer at every third byte of the count values.

15. A non-transitory computer-readable medium comprising instructions that, when executed by one or more processing units, cause the one or more processing units to:
generate an intermediate bitstream by entropy transcoding an input bitstream, wherein (i) the input bitstream represents a video signal, (ii) the input bitstream is a context-adaptive binary arithmetic coding (CABAC) bitstream, (iii) the intermediate bitstream is a context-adaptive variable-length coding (CAVLC) bitstream, (iv) the intermediate bitstream contains a plurality of network adaptation layer (NAL) units, and (v) each NAL unit is associated with a plurality of rows of macroblocks in the video signal;
extract a plurality of count values from the input bitstream during the entropy transcode to the intermediate bitstream, wherein the count values identify a start of each of the rows of macroblocks in the NAL units; and
generate an output bitstream by inserting entry point information into the NAL units, wherein (a) the output bitstream is a modified CAVLC bitstream, (b) the modified CAVLC bitstream comprises (i) a CAVLC bitstream, (ii) an end-of-row data code inserted after a trailing bits field of each NAL unit and (iii) the entry point information inserted in each NAL unit in an additional field adjoining both the end-of-row-data code and a start code for a subsequent NAL unit, (c) the entry point information comprises the count values and one or more emulation prevention elements, (d) the NAL units of the output bitstream are suitable to decode in a plurality of macroblock decoders using the count values and a wavefront parallel decoding technique, and (e) the additional field allows the macroblock decoders to parse the entry point information from the end of the NAL unit without needing to decode the entire NAL unit.

16. The non-transitory computer-readable medium of claim 15, wherein the count values are usable by the macroblock decoders to decode each NAL unit for the rows of macroblocks independently of decoding other NAL units for other rows of macroblocks.

17. An apparatus comprising:
a plurality of macroblock decoders configured to perform diagonal wavefront decoding to recreate a video signal; and
a router configured to (i) receive an input bitstream, wherein (a) the input bitstream contains a plurality of NAL units, (b) the input bitstream represents the video signal, (c) each NAL unit is associated with a plurality of rows of macroblocks in the video signal, (d) each NAL unit contains entry point information that identify where each of the rows of macroblocks begins in each NAL unit, (e) the input bitstream is a modified context-adaptive variable-length coding (CAVLC) bitstream and (f) the modified CAVLC bitstream comprises (A) a CAVLC bitstream, (B) an end-of-row data code inserted after a trailing bits field of each NAL unit and (C) the entry point information inserted in each NAL unit in an additional field adjoining both the end-of-row-data code and a start code for a subsequent NAL unit, where the entry point information comprises a plurality of count values and one or more emulation prevention elements, and the additional field allows the macroblock decoders to parse the entry point information from the end of the NAL unit without needing to decode the entire NAL unit, (ii) extract the count values from each NAL unit in the input bitstream, (iii) select one or more of the macroblock decoders based on the count values extracted from the input bitstream and (iv) route the NAL units to the one or more selected macroblock decoders, wherein each of the selected macroblock decoders is configured to (i) extract one of the count values from the additional field in a corresponding NAL unit (ii) jump the extracted count value number of bytes in the corresponding NAL unit to a start of one of the rows of the macroblocks and (iii) decode the one row of macroblocks.

18. The apparatus of claim 17, wherein the selected macroblock decoders are configured to decode the rows of macroblocks in wavefront order based on the count values.

19. The apparatus of claim 17, wherein (i) each NAL unit in the input bitstream includes skip run data and a quantization parameter inserted in the additional field with the count values and (ii) the selected macroblock decoders are configured to decode the NAL unit based on the skip run data and the quantization parameter.

20. A method for routing a bitstream comprising the steps of:
receiving an input bitstream, wherein (i) the input bitstream represents a video signal, (ii) the input bitstream comprises a plurality of network adaptation layer (NAL) units, (iii) each NAL unit is associated with a plurality of rows of macroblocks in the video signal, (iv) each NAL unit contains entry point information that identifies where each of the rows of macroblocks begins in each NAL unit, (v) the input bitstream is a modified context-adaptive variable-length coding (CAVLC) bitstream and (vi) the modified CAVLC bitstream comprises (A) a CAVLC bitstream, (B) an end-of-row data code inserted after a trailing bits field of each NAL unit and (C) the entry point information inserted in each NAL unit in an additional field adjoining both the end-of-row-data code and a start code for a subsequent NAL unit, where the entry point information comprises a plurality of count values and one or more emulation prevention elements, and the additional field allows a macroblock decoder to parse the entry point information from the end of the NAL unit without needing to decode the entire NAL unit;
extracting the count values from each NAL unit in the input bitstream;
selecting one or more of a plurality of macroblock decoders to decode the NAL units based on the count values extracted from the modified CAVLC bitstream;
routing the NAL units to the one or more selected macroblock decoders;
extracting one of the count values from the additional field in each NAL unit using the one or more selected macroblock decoders;
jumping the extracted count value number of bytes in the NAL unit to a start of one of the rows of macroblocks; and
decoding the one row of macroblocks using one of the selected macroblock decoders.

21. The method of claim 20, wherein the rows of macroblocks are decoded in wavefront order using the selected macroblock decoders based on the count values.

22. The method of claim 20, wherein (i) each NAL unit in the input bitstream includes skip run data and a quantization parameter inserted in the additional field with the count values and (ii) the selected macroblock decoders decode the NAL unit based on the skip run data and the quantization parameter.

* * * * *